(12) United States Patent
Amiri et al.

(10) Patent No.: US 11,777,598 B2
(45) Date of Patent: Oct. 3, 2023

(54) UTILIZING POLARIZATION CHARACTERISTICS TO DETECT VIBRATIONS IN OPTICAL FIBERS

(71) Applicant: Ciena Corporation, Hanover, MD (US)

(72) Inventors: Maryam Amiri, Ottawa (CA); Ivan Radovic, Ottawa (CA); Petar Djukic, Ottawa (CA); Firouzeh Golaghazadeh, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/746,342

(22) Filed: May 17, 2022

(65) Prior Publication Data

US 2022/0407597 A1 Dec. 22, 2022

Related U.S. Application Data

(60) Provisional application No. 63/212,885, filed on Jun. 21, 2021.

(51) Int. Cl.
*H04B 10/079* (2013.01)

(52) U.S. Cl.
CPC ................ *H04B 10/0795* (2013.01)

(58) Field of Classification Search
None
See application file for complete search history.

(56) References Cited

U.S. PATENT DOCUMENTS

| 7,992,440 | B2 * | 8/2011 | Kumagai | G01H 9/004 |
| | | | | 356/465 |
| 8,477,679 | B2 | 7/2013 | Sharifian et al. | |
| 8,887,217 | B2 | 11/2014 | Salem et al. | |
| 9,060,292 | B2 | 6/2015 | Callard et al. | |
| 9,432,257 | B2 | 8/2016 | Li et al. | |
| 9,686,816 | B2 | 6/2017 | Sun et al. | |
| 9,819,565 | B2 | 11/2017 | Djukic et al. | |
| 9,832,681 | B2 | 11/2017 | Callard et al. | |
| 9,871,582 | B2 | 1/2018 | Djukic et al. | |

(Continued)

OTHER PUBLICATIONS

Schwartz, Matthew, Lecture 14: Polarization, 2016 (Year: 2016).*

(Continued)

*Primary Examiner* — Jai M Lee
(74) *Attorney, Agent, or Firm* — Baratta Law PLLC; Lawrence A. Baratta, Jr.

(57) ABSTRACT

Systems and methods are provided for utilizing polarization parameters obtained from an optical network to determine vibrations in optical fibers using coherent optics equipment and machine learning techniques. A method, according to one implementation, includes the step of obtaining a time-series dataset that includes measurements of polarization characteristics of light traversing an optical fiber of an optical network. The method also includes the step of detecting vibration characteristics of the optical fiber based on the time-series dataset. In some implementations, the time-series dataset may be a multi-variate dataset and the polarization characteristics may be related to transients in a State of Polarization (SOP). The SOP, for example, may be represented by an amplitude and a phase of an electric field vector and may be defined as having one of a linear polarization, elliptical polarization, and circular polarization.

19 Claims, 5 Drawing Sheets

(56) References Cited

U.S. PATENT DOCUMENTS

| | | |
|---|---|---|
| 9,980,284 B2 | 5/2018 | Djukic et al. |
| 10,015,057 B2 | 7/2018 | Djukic et al. |
| 10,069,570 B2 | 9/2018 | Djukic et al. |
| 10,148,578 B2 | 12/2018 | Morris et al. |
| 10,153,869 B2 | 12/2018 | Djukic et al. |
| 10,390,348 B2 | 8/2019 | Zhang et al. |
| 10,448,425 B2 | 10/2019 | Au et al. |
| 10,491,501 B2 | 11/2019 | Armolavicius et al. |
| 10,623,277 B2 | 4/2020 | Djukic et al. |
| 10,631,179 B2 | 4/2020 | Djukic et al. |
| 10,634,552 B2 * | 4/2020 | Kanda ............... G01H 9/004 |
| 10,644,941 B2 | 5/2020 | Djukic et al. |
| 10,746,602 B2 | 8/2020 | Pei et al. |
| 10,887,899 B2 | 1/2021 | Au |
| 10,945,243 B2 | 3/2021 | Kar et al. |
| 11,342,990 B2 * | 5/2022 | Kuwabara .......... H04B 10/0795 |
| 11,378,443 B2 * | 7/2022 | Ip ..................... G01D 5/35361 |
| 11,620,528 B2 * | 4/2023 | Ryan ..................... G06N 3/045 |
| | | 709/224 |
| 2014/0229210 A1 | 8/2014 | Sharifian et al. |
| 2016/0377660 A1 * | 12/2016 | Müller ................ G01R 15/246 |
| | | 324/96 |
| 2018/0058886 A1 * | 3/2018 | Kanda ................. G01D 5/353 |
| 2018/0062943 A1 | 3/2018 | Djukic et al. |
| 2019/0230046 A1 | 7/2019 | Djukic et al. |
| 2019/0379589 A1 | 12/2019 | Ryan et al. |
| 2020/0067935 A1 | 2/2020 | Carnes, III et al. |
| 2020/0313380 A1 | 10/2020 | Pei et al. |
| 2020/0351380 A1 | 11/2020 | Fedorov et al. |
| 2020/0387797 A1 * | 12/2020 | Ryan ..................... G06N 3/084 |
| 2021/0028973 A1 | 1/2021 | Cote et al. |
| 2021/0076111 A1 | 3/2021 | Shew et al. |
| 2021/0150305 A1 | 5/2021 | Amiri et al. |
| 2022/0146287 A1 * | 5/2022 | Xie ........................ H04B 10/50 |
| 2022/0146304 A1 * | 5/2022 | Hu ......................... G01H 9/004 |
| 2022/0236083 A1 * | 7/2022 | Ip .......................... G01H 9/004 |
| 2023/0061220 A1 * | 3/2023 | Kitahara ............... G01H 9/004 |

OTHER PUBLICATIONS

Kaplan et al., An improved BiGAN based approach for anomaly detection, ScienceDirect, 2020 (Year: 2020).*

Roudas et al., Coherent Frequency-Selective Polarimeter for Polarization-Mode Dispersion Monitoring, 2004 (Year: 2004).*

Teixeira et al., "Advanced Fiber-Optic Acoustic Sensors," Photonic Sensors / vol. 4, No. 3, 2014, pp. 198-208.

Phaal et al., "InMon Corporation's sFlow: A Method for Monitoring Traffic in Switched and Routed Networks," Network Working Group, Category: Informational, The Internet Society, Sep. 2001, pp. 1-31.

Quittek et al., "Requirements for IP Flow Information Export (IPFIX)," Network Working Group, Category: Informational, The Internet Society, Oct. 2004, pp. 1-33.

B. Claise, "Cisco Systems NetFlow Services Export Version 9," Network Working Group, Category: Informational, The Internet Society, Oct. 2004, pp. 1-33.

Claise et al., "Specification of the IP Flow Information Export (IPFIX) Protocol for the Exchange of Flow Information," Internet Engineering Task Force (IETF), Obsoletes: 5101, Category: Standards Track, ISSN: 2070-1721, Sep. 2013, pp. 1-76.

Zhang et al., "Fast Accurate Computation of Large-Scale IP Traffic Matrices from Link Loads," ACM 1581136641/03/0006, 2003, pp. 1-12.

Medina et al., "Traffic Matrix Estimation: Existing Techniques and New Directions," ResearhGate, ACM 158113570X/02/0008, 2002, pp. 1-15.

* cited by examiner

UTILIZING POLARIZATION CHARACTERISTICS TO DETECT VIBRATIONS IN OPTICAL FIBERS

CROSS-REFERENCE TO RELATED APPLICATIONS

The present application claims the benefit of priority to U.S. Provisional App. No. 63/212,885, filed Jun. 21, 2021, entitled "Detecting fiber vibrations with coherent optics and deep neural networks," the entire contents of which are incorporated by reference herein.

Also, the present disclosure generally relates to a) U.S. Pat. No. 9,871,582, issued Jan. 16, 2018, and entitled "Optical channel telemetry," b) U.S. patent application Ser. No. 16/430,808, filed Jun. 4, 2019, and entitled "Pattern detection in time-series data," and c) U.S. patent application Ser. No. 16/540,414, filed Aug. 14, 2019, and entitled "Unsupervised outlier detection in time-series data," wherein the entire contents of each are incorporated by reference herein.

TECHNICAL FIELD

The present disclosure generally relates to optical networks. More particularly, the present disclosure relates to systems and methods for utilizing coherent optics equipment of an optical network to obtain polarization characteristics, such as transient information in a State of Polarization (SOP) parameter, and using the polarization characteristics to determine vibrations in fiber optic cables of the optical network.

BACKGROUND

Machine Learning (ML) can be used in many environments for analyzing complex information to train ML models and then utilize these ML models to make predictions about some environments, perform Root Cause Analysis (RCA) to determine faults in other environments, etc. In ML, classification procedures may also be used for assigning labels to instances in the data and categorizing the instances into precise classes. In some cases, a Deep Neural Network (DNN), having multiple layers between an input layer and an output layer, can be used.

In the field of optical networks, data can be transferred in the form of light waves over long spans of fiber optic cable. For example, light waves may be generated at a transmitter and forwarded over a fiber link to a receiver. ML techniques may be used in different scenarios for observing current time-series datasets and applying this data to ML models for network planning, routing, and other operations for increasing the speed and efficiency of transmissions throughout the optical network, lowering costs, etc.

Conventionally, performance monitoring, problem detection, and RCA are performed in a manual fashion after a failure has occurred. This approach is often taken across various application areas, such as manufacturing, vehicle maintenance, airplane maintenance, healthcare, building maintenance, road, and other infrastructure maintenance. This manual approach can be expensive, time-consuming and requires a human expert with the knowledge of the given system to debug the problem after a failure. At the same time, the number of monitors is increasing, and the Internet of Things (IoT) is connecting things to the network that would not conventionally be connected or monitored. The manual approach to performance monitoring with the failure and debug cycle is not feasible. At the same time, it would be desirable to decrease the cost even in current manual approaches by introducing ML methodologies for pattern detection to enable new systems to detect and forecasting faults before they occur and to find patterns in time-series that can be used to pin-point the causes of failures.

As an example, conventional network performance monitoring applied to the areas mentioned above may be implemented after a failure has occurred. Specifically, following a failure in a network, an operator or technician would log into the system, perform a manual investigation, and provide remediation. Of course, this approach is reactive and typically involves a traffic hit, traffic loss, protection switching, etc., followed by network maintenance. Another approach to anomaly detection is to re-implement the failure scenario via a piece of software that can run and analyze the scenario in an offline manner. For a handful of Performance Monitoring (PM) metrics relating to the problem, alarms would be raised if any given PM crosses some pre-defined threshold. This is typically achieved using a rule-based engine with hard-coded "if . . . then . . . else . . . " statements specified by a human expert.

Disadvantageously, with these conventional approaches, the reaction time is slow, engineering time is expensive, and experts are rare. Also, this approach only finds known failures that are also easy to specify. The approach presumes that the human expert is able to articulate the specific reason for a network failure and that this network failure happens due to the threshold crossing at one point. The approaches cannot and are not used to finding failures that span multiple network elements, links, etc. Further, these approaches do not scale with large and complex networks. Also, these conventional approaches require a lot of expertise, work, and time to implement.

Current approaches in pattern detection are limited to finding objects in images, recognizing letters, speech-to-text conversion, text, or speech translation, etc. Pattern recognition in audio has some similarities to network applications, but these approaches only ever use Recurrent Neural Networks (RNNs). The vast majority of currently published network anomaly detection algorithms are not based on ML. Typically, these approaches use Principal Component Analysis (PCA), or its derivatives, to find outliers in multi-dimensional data.

Time-Series Classification (TSC) is defined as predicting a valid labeled class to an input time series sequence. TSC has been a topic of research for some time and originated to solve the problem of speech recognition. TSC with DNNs is a newer topic and may include one-dimensional Convolutional Neural Networks (CNNs), which explores the patterns in one-dimensional space (time) of the time-series.

U.S. patent application Ser. No. 16/430,808, published as U.S. Pub. No. 2019/0379589, proposes a way to convert the time-series into an image and use DNN (e.g., CNN, Region-based CNN (R-CNN), Mask R-CNN, etc.). In a more recent approach, time-series is also transformed into an image and then the pre-trained existing model for an image (e.g., Inception v3) is used for TSC. Inception-Time is a more advanced and complex CNN architecture and includes an ensemble of five Inception classifiers. This process applies different convolution filter sizes to the time-series itself and therefore can explore features with diverse sizes.

Classic TSC approaches, such as k Nearest Neighbors (k-NN) can be coupled with Dynamic Time Warping (DTW) distance measures (despite their efficient accuracy) and are not suitable for real-word TSC. However, the reason they fail is for long and noisy time-series or they usually suffer from high computational complexity. The problem with a Multi-Layer Perceptron (MLP) designed architecture is that temporal information is lost, and the extracted features in the time-series are time-invariant. It is noted that more complex DNN architectures, such as Inception-Time and Reservoir Computing (RC) need a tremendous amount of data to generalize well on new unseen samples.

Therefore, there is a need in the field of optical networks, particularly when various ML algorithms are utilized, to overcome the issues with the conventional systems and provide analysis of certain optical characteristics, such as polarization, for analyzing the status of the optical network, such as detecting when optical fibers are experiencing vibrations, which may be caused by various external factors.

BRIEF SUMMARY

The present disclosure focuses on systems and methods for utilizing Machine Learning (ML) methodologies in the field of optical networks for analyzing the optical networks. As such, the systems and methods of the present disclosure may be able to obtain a large amount of polarization characteristics and process this information to detect the State of Polarization (SOP). Changes or transients in the SOP can then be observed to determine when fiber optic cables are experiencing vibrations, which may be caused by nearby construction equipment (e.g., jackhammers, tractors, etc.), locomotives, vehicles, etc.

According to one implementations, a process is described for utilizing polarization parameters obtained from an optical network to determine vibrations in optical fibers using coherent optics equipment and machine learning techniques. The process, for example, may include a first step of obtaining a time-series dataset that includes measurements of polarization characteristics of light traversing an optical fiber of an optical network. Then, the process may include the step of detecting vibration characteristics of the optical fiber based on the time-series dataset. According to some embodiments, the time-series dataset may be a multi-variate dataset, and the polarization characteristics may be related to transients in a State of Polarization (SOP). The SOP, for example, may be represented by an amplitude and a phase of an electric field vector and may be defined as having one of a linear polarization, elliptical polarization, and circular polarization.

In some embodiments, the process may further include a step of utilizing a Deep Neural Network (DNN) to convert the time-series dataset into images and perform a Root Cause Analysis (RCA) for classifying external events. The DNN may be configured to utilize one or more of a Gramian Agular Summation Field (GASF) procedure, a Wavelet Transform (WT) procedure, a sliding window procedure, and a matrix stacking procedure.

For example, the GASF procedure may include a) scaling the time-series dataset to be within a numeric range, b) convert the time-series dataset to a polar coordinate system using an angular cosine technique to create a vector having polar encoding, and c) using GASF to transform the vector into a matrix. The WT procedure, for example, may include a) generating a grayscale image of a power spectrum of each data point of the time-series dataset, b) decomposing a function into a set of wavelets, and c) using WT to convert one-dimensional data points to two-dimensional grayscale images. The sliding window procedure, for example, may include a) generating a matrix for each time-series data point under consideration, and b) applying Fourier transform to the matrix. The matrix stacking procedure, for example, may include a) converting the time-series dataset into a group of matrices, b) stacking the matrices into a larger multi-variate matrix including a resultant image having an RGB format, c) passing the resultant image to a three-channel neural network including one or more of a Convolution Neural Network (CNN), an image-processing DNN, a Recurrent Neural Network (RNN), and a region-based Mask CNN (Mask R-CNN), and d) converting the resultant image to grayscale as a grayscale spectrogram. The matrix stacking procedure, for example, may further include e) passing the stacked multi-variate matrix through CNN using Region of Interest (RoI) pooling to identify anomalous regions and to determine when an anomaly occurs in time for anomaly classification.

The measurements of the polarization characteristics may be obtained from coherent optics equipment of the optical network. The coherent optics equipment, for example, may include an optical receiver of a Network Element (NE) operating in the optical network. The optical receiver may be configured to measure the polarization characteristics during an equalization process of coherent optical communications within the optical network without the need for dedicated sensing devices.

In some embodiments, the process may further include utilizing the vibration characteristics to predict damage to an infrastructure in the vicinity of the optical fiber. The process may also include detecting a pattern or anomaly in the time-series dataset using a Bidirectional Generative Adversarial Network (BiGAN) unsupervised learning technique. For example, the BiGAN unsupervised learning technique may utilize a generator, encoder, and discriminator. Also, the BiGAN unsupervised learning technique may further utilize a decomposition element and a clustering element.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
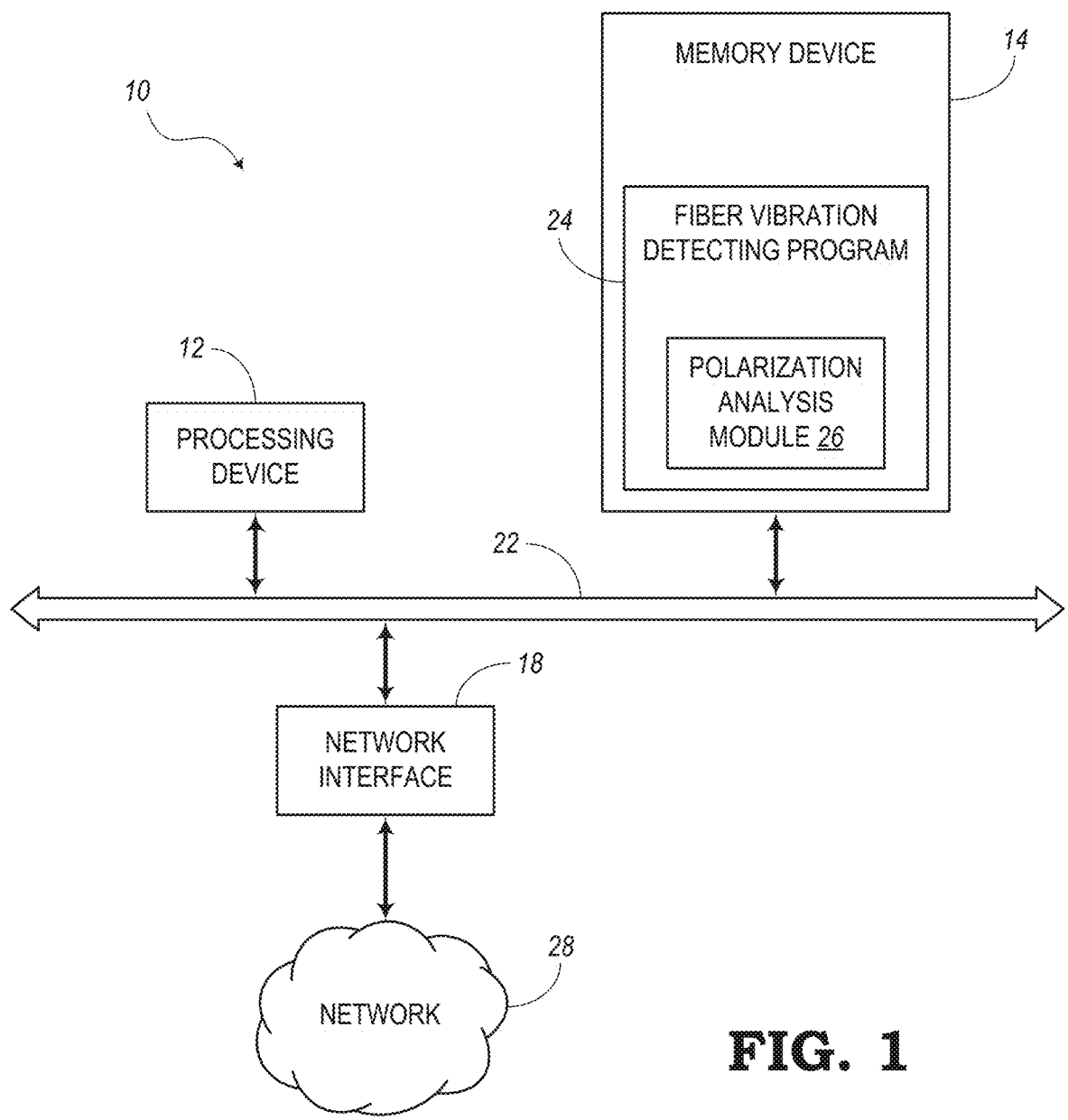
FIG. 1 is a block diagram illustrating a Network Element (NE) that may be operating in an optical network, according to various embodiments.

The present disclosure relates to systems and methods for detecting vibrations in fiber optic cable that has been installed in an optical network. For example, natural phenomena may cause vibrations in fiber optic cable installed either above ground or below ground. For example, lightning, rain, wind, etc. may be responsible for causing fiber vibrations for cables installed above the ground, while earthquakes, etc. may be responsible for cause fiber vibrations for cables installed below the ground. In addition to natural phenomena, fiber vibrations may be caused by man-made objects that can create ground vibrations, such as vehicles, trucks, trains, construction equipment, etc., particularly when cables are installed near roadways, railways, etc.

As a result of these events that cause vibrations in the fiber optic cables, certain transients in the propagated optical signals may be created, which of course can affect the signal quality. In particular, the embodiments of the present disclosure are configured to detect changes in the polarization of the light wave signals travelling through the fibers (e.g., State of Polarization (SOP) transients, etc.). Coherent receivers may be used to track SOP transients and then provide certain compensation to minimize the negative effects of the vibrations. Also, measurement information can be used to classify different events (e.g., a fiber being pinched, a person using a jackhammer near a line, a train traveling down a railroad track, etc.). By classifying these events, Machine Learning (ML) models can be trained and then used for performing Root Cause Analysis (RCA) to determine the cause of the fiber vibrations.

In some embodiments, it is possible to analyze polarization characteristics (e.g., SOP changes, SOP transients, or other polarization changes) of the optical fibers in an optical network. By performing various ML techniques on the time-series data, the embodiments of the present disclosure are configured to detect patterns in the polarization characteristics to classify certain fiber vibration events.

Conventional ML approaches sometimes use Deep Neural Networks (DNNs), which may be based on Reservoir Computing (RC), which is a family of Recurrent Neural Networks (RNNs). Although the RC approach is typically faster than RNN, the reservoir model space (e.g., its feature extraction transformation) has computational and storage overhead costs that can be problematic. The present disclosure describes embodiments that overcome issues of conventional systems, such as by using ML to classify the fiber vibrations based on State of Polarization (SOP) estimates. Thus, the present disclosure is configured to employ supervised learning and use DNNs in a manner that has not been attempted in previous approaches.

SOP transients are random and unpredictable and may be caused by fiber vibrations. In some embodiments, the Stokes space angular velocity may be measured. Also, the systems and methods may determine the geographic location of the fibers at the specific events where SOP transients were detected. The embodiments may observe the transients and correlate the events in both time and location to external or environmental factors (e.g., lightning strikes, construction events, jackhammer usage, trains, tractor trailers, etc.).

The present disclosure may use a rate of change of the (SOP) detected in the optical fiber by coherent polarization receivers. Certain compensation strategies may be used to recover SOP to avoid polarization crosstalk. SOP transients of various rates may be measured in the installed optical fibers and may be used to determine the root cause.

Coherent receivers may be used in the optical networks to track the SOP for performing compensation as needed. These receiver may obtain a large amount of day, such as about 40 k measurements per second, to get the SOP at every symbol. Because of the large amount of data, it may be beneficial in some embodiments to provide processing on a Network Element (NE) (e.g., node, router, switch, etc.) itself to enable the ML processes to be performed. The NE can then quickly label the different types of disturbances (e.g., data X=jackhammer, data Y=fiber pinch, etc.) and use this data to train a ML model. The output is a trained model that can then be used to classify SOP events. By classifying the specific disturbance, the ML model can be used for Root Cause Analysis (RCA). In mathematics, a time series is a series of data points indexed (or listed or graphed) in time order. Most commonly, a time series is a sequence taken at successive equally spaced points in time.

FIG. 1 is a block diagram illustrating an embodiment of a Network Element (NE) 10 operating in a network. In the illustrated embodiment, the NE 10 may be a digital computing device that generally includes a processing device 12, a memory device 14, and a network interface 18. In some embodiments, the NE 10 may include input/output devices for enabling a user (e.g., network administrator, technician, etc.) to interact with the NE 10 as needed. It should be appreciated that FIG. 1 depicts the NE 10 in a simplified manner, where some embodiments may include additional components and suitably configured processing logic to support known or conventional operating features. The components (i.e., 12, 14, 18) may be communicatively coupled via a bus interface 22. The bus interface 22 may include, for example, one or more buses or other wired or wireless connections. The bus interface 22 may also include controllers, buffers, caches, drivers, repeaters, receivers, among other elements, to enable communication. Further, the bus interface 22 may include address, control, and/or data connections to enable appropriate communications among the components 12, 14, 18.

It should be appreciated that the processing device 12, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 12 may also include or utilize stored program instructions (e.g., stored in hardware, software, and/or firmware) for control of the NE 10 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 14 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 14 may incorporate electronic, magnetic, optical, and/or other types of storage media. The memory device 14 may have a distributed architecture, where various components are situated remotely from one another, but can be accessed by the processing device 12.

Software stored in the memory device 14 may include one or more programs, each of which may include an ordered listing of executable instructions for implementing logical functions. The software in the memory device 14 may also include a suitable Operating System (O/S) and one or more computer programs. The 0/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 12), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 12 or other suitable circuitry or logic). For example, when executed, the instructions may cause or enable the processing device 12 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 12), or any suitable combination thereof. Software/firmware modules may reside in the memory device 14, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The network interface 18 may be used to enable the NE 10 to communicate over a network, the Internet, a Wide Area Network (WAN), a Local Area Network (LAN), and the like. The network interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 18 may include address, control, and/or data connections to enable appropriate communications on the network 28.

The NE 10 may include a fiber vibration detecting program 24. The fiber vibration detecting program 24 may be configured in software or firmware and stored in the memory device 14 and/or may be configured in hardware in the processing device 12. In some embodiments, the fiber vibration detecting program 24 may be stored on a non-transitory computer-readable medium and includes computer logic and/or instructions for enabling the processing device 12 to perform functionality to detect fiber vibrations in the fiber cables of the network 28 in which the NE 10 is operating. Also, in some embodiments, the fiber vibration detecting program may include a polarization analysis module 26, which may be configured to analyze polarization characteristics of light propagating through the fiber cables being monitored. As such, by monitoring the polarization characteristics, the fiber vibration detecting program 24 may be configured to perform certain ML techniques for utilizing the polarization information to determine the root cause of fiber vibration events.

Regarding polarization characteristics, it should be understood that a polarized light wave signal propagating in a fiber may be represented by electric and magnetic field vectors that are formed at right angles with respect to one another and at right angles with respect to the direction of light through the fiber. Polarization may refer to a specific pattern that can be traced out in a transverse plane by the electric field vector as a function of time. The State of Polarization (SOP), or polarization state, can be defined by amplitude and phase of the orthogonal electric field components. With no phase shift, the electric field vectors would produce a linear trace in the transverse, which thereby results in a linear polarization. With a phase shift is greater than 0° but less than 90°, the electric field vectors would produce an elliptical trace, which thereby results in an elliptical polarization (i.e., either right-hand elliptical polarization or left-hand elliptical polarization). If the phase shift is 90°, the electric field vectors produce a circular trace, which thereby results in a circular polarization (i.e., either right-hand circular polarization or left-hand circular polarization).

Also, the fiber vibration detecting program 24 may be configured to detect patterns in time series with DNNs supervised learning and unsupervised learning, as described in U.S. Pub. No. 2019/0379589 and U.S. Pub. No. 2021/0089927, the contents of which are incorporated by reference herein. Of note, the embodiments of present disclosure may specifically deal with the problem of detecting patterns in SOP time-series datasets, which is multi-variate in nature (as opposed to the single-variate time-series data used in the referenced documents).

Due to the software limitations of moving measurements from coherent optical equipment off the NE 10, the present disclosure proposes embodiments that may include the examples of DNNs described in U.S. Pat. No. 9,871,582, the contents of which are incorporated by reference herein. For example, the fiber vibration detecting program 24 may include any suitable ML processes, algorithms, etc., which may include any one or more of Deep Neural Network (DNN) techniques, Convolution Neural Network (CNN) techniques, Recurrent Neural Network (RNN) techniques, k Nearest Neighbor (k-NN) techniques, Dynamic Time Warping (DTW) techniques, Gramian Angular Summation Field (GASF) techniques, Bidirectional Generative Adversarial Network (BiGAN) techniques, etc.

According to some embodiments, the present disclosure may be configured to:

1) use a DNN to classify multi-variate time-series data using approaches such as GASF, Wavelet transform, matrix stacking, etc., followed by a supervised or unsupervised DNN, 2) use a DNN to detect vibrations, where the vibrations are reflected in the SOP on a fiber and the SOP is estimated on the fiber during an equalization process of coherent optical communications, 3) use the DNN to perform an unsupervised classification with BiGAN, followed by a clustering process, and 4) use DNN in-skin (e.g., in the NE 10) and classify SOP on optical receivers of the NE 10. It may be noted that "in-skin" in this disclosure may refer to measurements and computations performed in the NE 10 itself of other suitable network devices operating in an optical network being monitored.

Optical fibers that have already been deployed provide a compelling way to implement a large-scale vibration sensing system on an optical network. This may be due to their concealment, flexibility, and immunity to electro-magnetic interference as described by Liu et al., "Distributed Fiber-Optic Sensors for Vibration Detection," Sensors (Basel, Switzerland) vol. 16, 8 1164. 26 Jul. 2016, doi:10.3390/s16081164), the contents of which are incorporated by reference herein. Existing piezoelectric, magnetostrictive, capacitive, and inductive technologies have a short detection range and are susceptible to electro-magnetic interference. Therefore, the fiber vibration detecting program 24 of the present disclosure may be configured to monitor polarization characteristics (e.g., SOP) in the associated fibers of the optical network. The fiber vibration detecting program 24 can be used to detect continuous and damped vibration with a frequency range of sub-hertz to 16 kHz, which may include similarities to the processes described in Zhang et al., "Continuous and Damped Vibration Detection Based on Fiber Diversity Detection Sensor by Rayleigh Backscattering," Journal of Lightwave Technology, vol. 26, no. 7, pp. 832-838, Apr. 1, 2008, doi: 10.1109/JLT.2008.919446), the contents of which are incorporated by reference herein. It may be noted that fibers are not susceptible to the same electromagnetic interference as the other dedicated sensors. By detecting vibrations in optical fibers, the fiber vibration detecting program 24 may be configured to detect a precursor to (or predict) infrastructure damage in large structures (e.g., bridges, highways, pipelines, offshore platforms, etc.) and/or detect natural phenomena (e.g., lightning, seismic activity, etc.).

The present disclosure is also configured to use supervised and unsupervised ML (with DNNs) to detect patterns of vibration from SOP estimates obtained with coherent optical receivers. Thus, these processes can be performed with optical equipment that is already deployed, which may be described with respect to other SOP work in Zhan et al., "Optical polarization-based seismic and water wave sensing on transoceanic cables," Science, 2021 Feb. 26; 371(6532): 931-936. doi: 10.1126/science.abe6648, the contents of which are incorporated by reference herein. Vibrations can be detected using SOP estimated during coherent optical communications. The advantage of using coherent optical equipment instead of dedicated optical sensor equipment is that the cost of these ubiquitous coherent systems is less than deploying and using dedicated sensors.

Vibration Detection with SOP

There are many pattern detection and system design problems that may arise in automating the detection of vibration patterns of interest in SOP estimates from coherent optical receivers. In particular, the present disclosure addresses (1) the multi-variate pattern detection problems arising in the detection of vibrations in SOP estimates and (2) the problems with obtaining SOP estimates at sufficiently high frequency to detect high frequency vibrations.

The fiber vibration detecting program 24 may use a DNN approach for supervised and unsupervised detection of vibrations. This may be based on time-series learning approaches, such as those proposed in U.S. Pub. No. 2019/0379589 and U.S. Pub. No. 2021/0089927. The ability to detect vibrations with unsupervised learning removes the need for experts to devise experiments or analyze SOP measurements with other data (e.g., seismic measurements, acoustic measurements, etc.), which makes the approach in the present disclosure very practical. This also could be done in-skin (in the NE 10) to enable detection of high frequency vibrations.

Time-Series Processing

In the multi-variate case, the NE 10 may be configured to convert each grouping of time-series data into an image. This can be achieved in multiple ways, where a few examples are outlined below.

A first option includes using Gramian Angular Summation Field (GASF) for the conversion. The first step in this process is scaling all the time series to be within [−1, 1]:

$$x'_i = \frac{(x_i - \text{Max}(X)) + (x_i - \text{Min}(X))}{\text{Max}(X) - \text{Min}(X)},$$

where $x_i$ is a specific value at a time point i and $x'_i$ is its scaled value. Once the time series has been scaled, the NE 10 converts it to the polar coordinate system using the angular cosine:

$$\theta_i = \arccos(x'_i)\{-1 \leq x'_i \leq 1, x'_i \in X\}$$

The result is a vector that has the polar encoding of the time series. This vector is then transformed into a matrix using the GASF:

$$\text{GASF}_{i,j} = \cos(\theta_i + \theta_j).$$

The GASF creates a (n×n) matrix from a time series with n steps. The matrix is structured such that the flow of time proceeds from the top left of the matrix to the bottom right.

Figure 2:
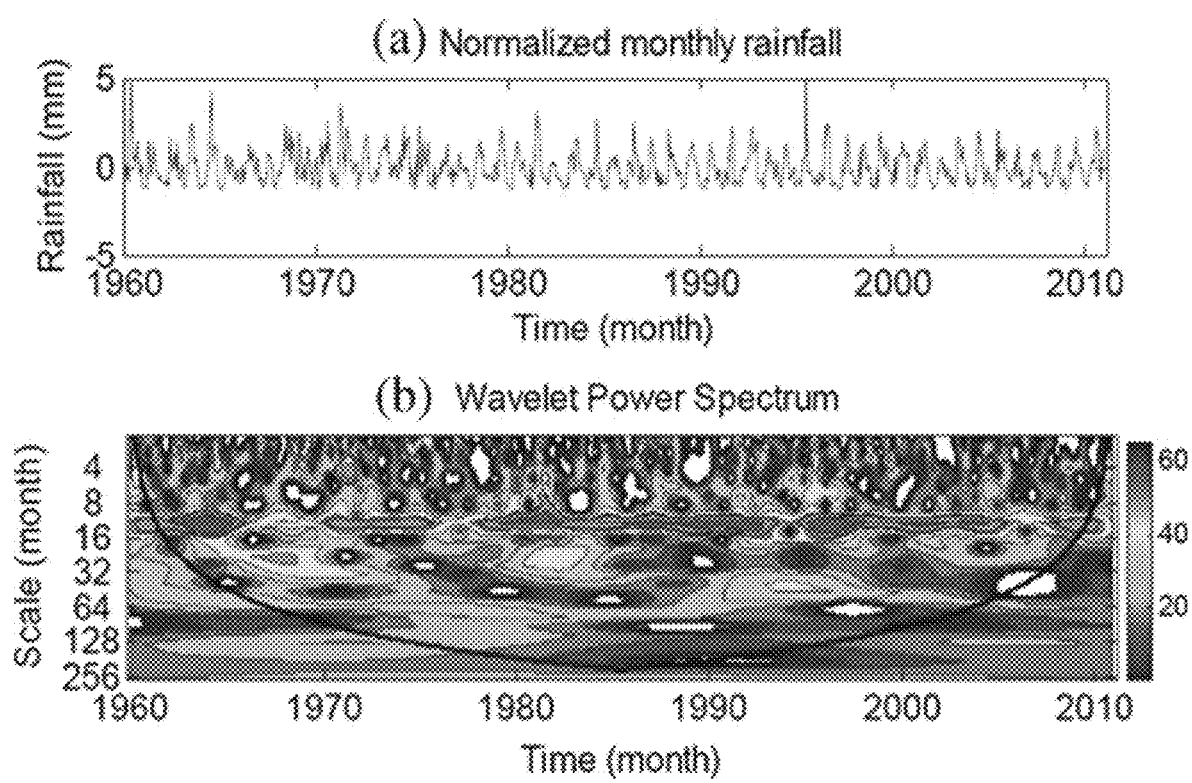
FIG. 2 is a graph of a Wavelet Transform (WT) used for converting a time-series dataset to an image, according to various embodiments.

The second option is to use the discrete Wavelet Transform (WT) procedure to generate a grayscale image of the power spectrum of each time-series. With this approach, the WT decomposes a function into a set of wavelets. For this purpose, one-dimensional signal data is converted to two-dimensional gray images by the WT method. FIG. 2 is a graph of a WT for converting a time-series to an image.

The third option is to use a sliding window approach, which may be similar to the procedure outlined in U.S. Pub. No. 2019/0379589 and U.S. Pub. No. 2021/0089927. The sliding window approach may include generating a matrix for each of the time-series datasets under consideration. The procedure may also include applying a Fourier transform to the matrix to enhance the performance of the method.

Comparing the second and third, it may be noted that the step of applying the Fourier transform may capture global frequency information, which may be a disadvantage in some cases, since frequencies may persist over an entire signal. This kind of signal decomposition may not serve all applications well where signals have short intervals of characteristic oscillation.

Pattern Detection with Multi-Variate Time-Series

Once all the time-series have been converted to matrices, they are combined by stacking the matrices vertically or horizontally into a larger matrix. Other methods may be possible such as addition or superimposition of the images on top of each other.

Once the multi-variate matrix is generated, it is processed for DNN use. There are several options for processing an image matrix before passing it to a DNN. One approach includes passing the resultant image in RGB format to a three-channel Convolutional Neural Networks (CNN) or other image processing DNN (e.g., Mask R-CNN). Although RGB is a widely known image format, there also exists many alternative color spaces that could provide similar or better results, depending on the application and type of anomaly. In the approach outlined above, the image may be converted to grayscale as a grayscale spectrogram, which may include all the relevant information in its pixel intensities, but at a fraction of the size and associated computational cost.

Figure 3:
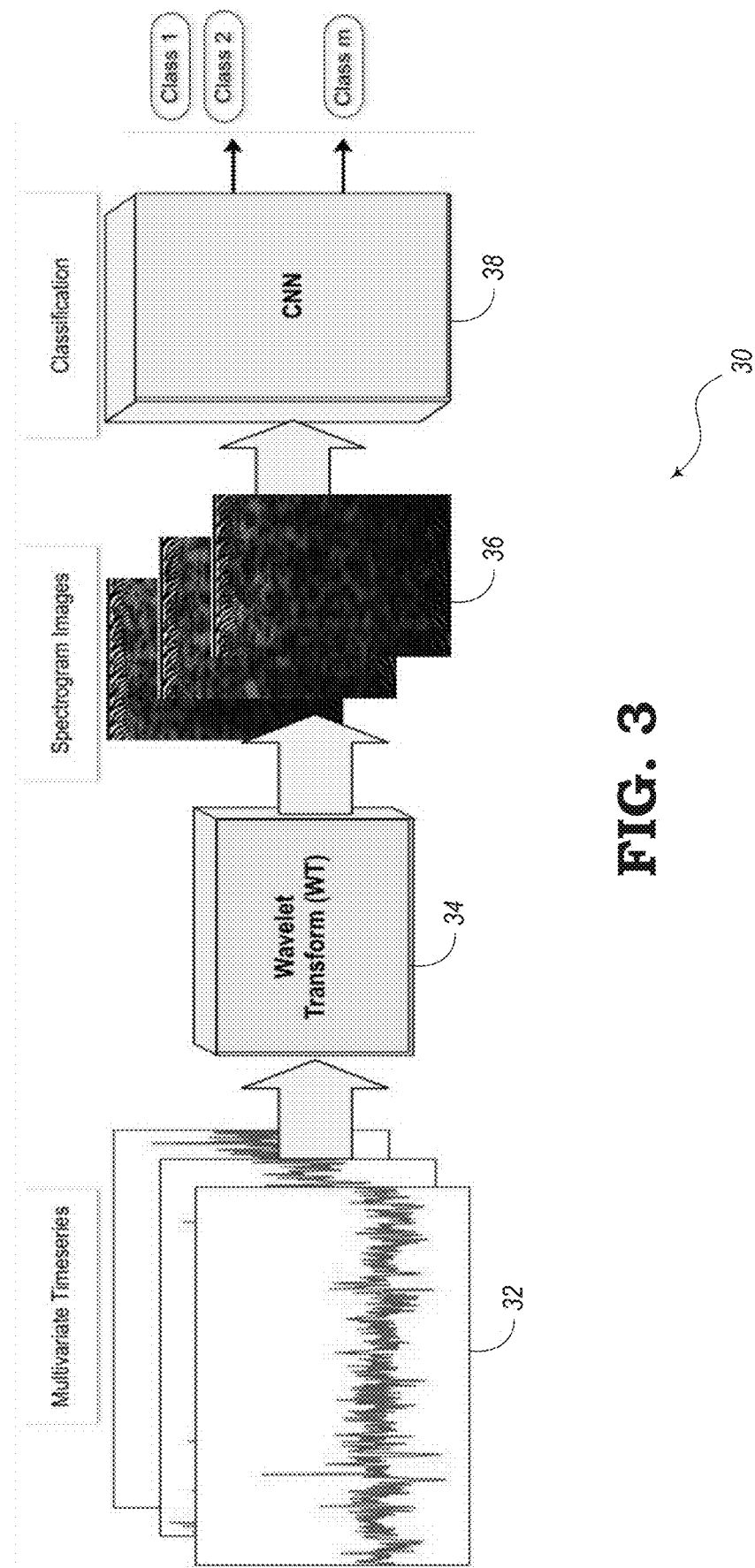
FIG. 3 is a diagram of a Convolutional Neural Network (CNN) pattern detection system, according to various embodiments.

FIG. 3 is a diagram showing an embodiment of a CNN pattern detection system 30. The CNN pattern detection system 30 includes a set of multi-variate time-series datasets 32, such as SOP time-series data. These datasets 32 are passed to a Wavelet Transform (WT) module 34 configured to provide spectrogram images 36 (e.g., grayscale images). The spectrogram images 36 are sent to a CNN classifier module 38. The CNN classifier module 38 is configured to classify the SOP data into one or more classes. FIG. 3 shows the use of the WT procedure combined with grayscale images and the CNN classifier module 38 is used for classification of the SOP time-series.

Unsupervised Pattern Detection

Once the images have been stacked, the ML of the fiber vibration detecting program 24 is configured to anomaly detection and classification, which may be similar to the processes of U.S. Pat. No. 9,871,582. This would involve passing the stacked matrix through the specified CNN classifier module 38, which may use Region of Interest (RoI) pooling in order to clearly identify anomalous regions in each time-series. From this information, the user may be able to identify the location in time that the anomaly or outlier occurred. For a given use case, the approach could be extended to include classification of the anomaly if the necessary information is available.

A Bidirectional Generative Adversarial Network (BiGAN) can be used to perform unsupervised anomaly detection. The general principle is as follows. When performing supervised anomaly detection, the output of the CNN is a class that corresponds to the type of anomaly detected. For example, in the instance where there are k outputs, the output of the CNN will be a number between 1 and k. This value is then taken and fed as the input to the BiGAN.

Figure 4:
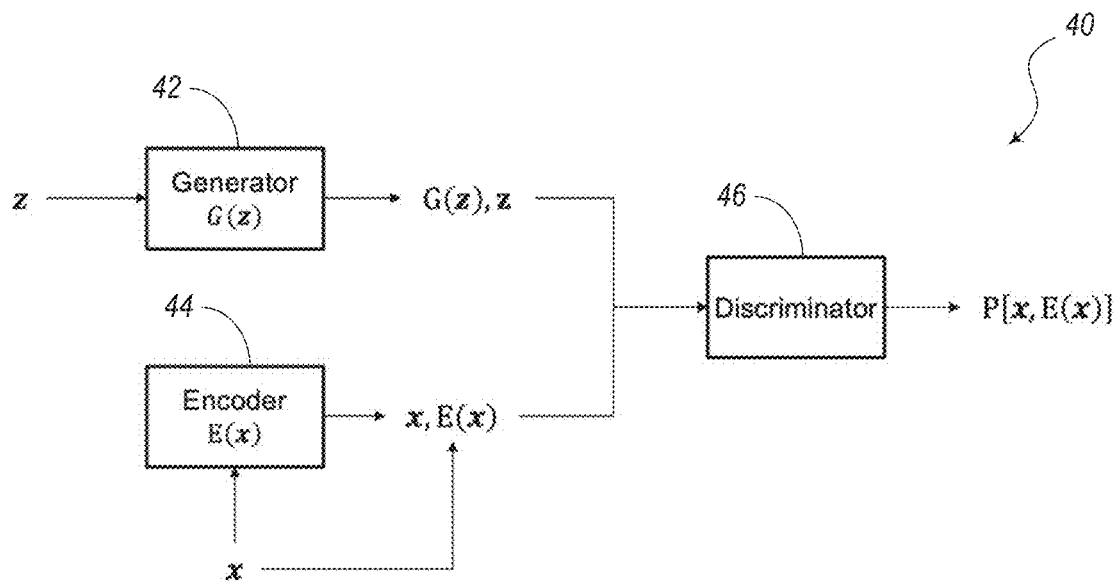
FIGS. 4 and 5 are diagrams of BiGAN-based unsupervised pattern detector, according to various embodiments.

FIG. 4 is a diagram of a BiGAN-based unsupervised pattern detector 40. The BiGAN-based unsupervised pattern detector 40 may be a generative model that trains three elements: a generator 42, a discriminator 44, and an encoder 46. The generator 42 takes the latent representation of the data (e.g., the encoding provided by the CNN) and generates a sample that resembles the true data. The encoder 44 takes the raw input and learns to perform the same encoding as that provided by the CNN. Finally, the discriminator 46 attempts to learn to discriminate two criteria. First, the discriminator 46 discriminates between the sample created by the generator 42 and the original data sample z. Second, the discriminator 46 distinguishes between the latent representation provided by the CNN (z) and the representation generated by the encoder 44 (E(x)). By learning to distinguish in both instances, the discriminator 46 ensures that the generator 42 and encoder 44 learn to invert one another. Thus, it is possible to accurately generate both the encoding and the raw representation of the data.

As with the supervised case, the systems and methods may extend the unsupervised anomaly detection to the multi-variate case. In order to do so, the same techniques used for the generator 42, discriminator 46, and encoder 44 are applied. This gives a multi-channel network that can handle the multivariate case, particularly as it applies to SOP.

Figure 5:
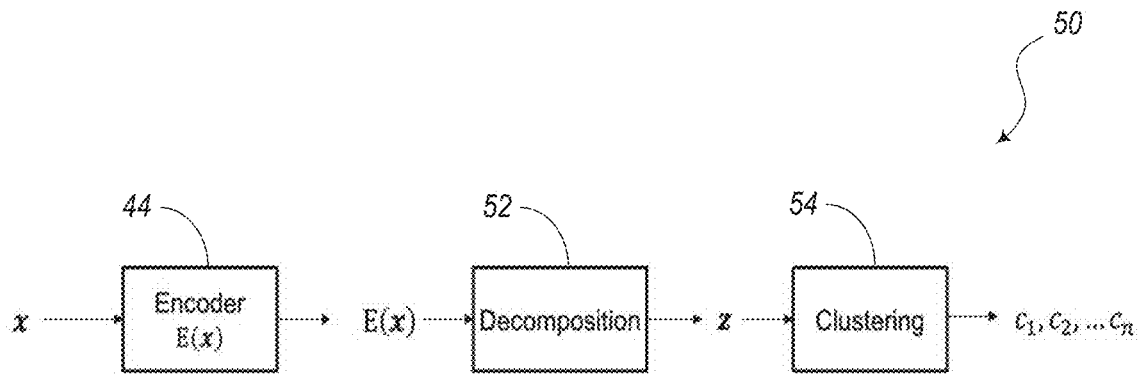

FIG. 5 shows an embodiment of a clustering technique 50, which may be part of the BiGAN-based unsupervised pattern detector 40 processes for performing clustering. The encoder 44 can be used to transform multi-variate time-series data into more compact latent representations. These latent representations, with a lower dimensionality, can then be further reduced by applying a decomposition technique 52, such as t-distributed Stochastic Neighbor Embedding (t-SNE). These compact representations can then be combined into clusters using standard clustering techniques 54, such as k-means clustering or hierarchical clustering. Alternatively, the BiGAN-based unsupervised pattern detector 40 could directly use the output of the discriminator 46 as the input to the clustering algorithm 54. Clustering provides additional insight into the similarities or differences between diverse types of outliers when they are all mapped to a common, compact feature space.

Figure 6:
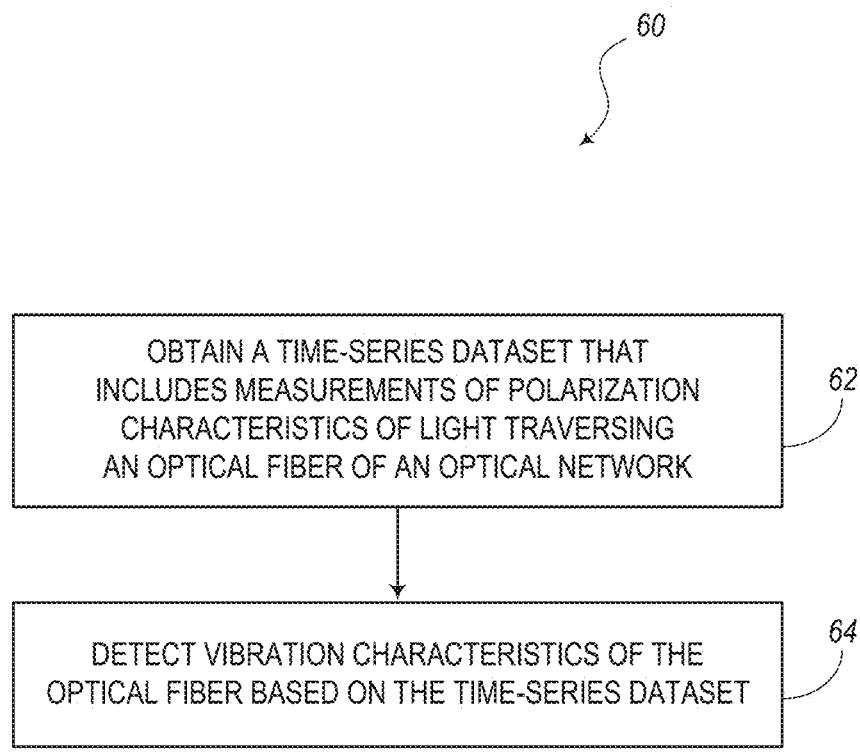
FIG. 6 is a flow diagram of a process for detecting fiber vibrations, according to various embodiments.

FIG. 6 is a flow diagram illustrating an embodiment of a process 60 for utilizing polarization parameters obtained from an optical network to determine vibrations in optical fibers using coherent optics equipment and machine learning techniques. In the illustrated embodiment, the process 60 includes a first step of obtaining a time-series dataset that includes measurements of polarization characteristics of light traversing an optical fiber of an optical network, as indicated in block 62. Then, the process 60 includes the step of detecting vibration characteristics of the optical fiber based on the time-series dataset, as indicated in block 64. According to some embodiments, the time-series dataset may be a multi-variate dataset, and the polarization characteristics may be related to transients in a State of Polarization (SOP). The SOP, for example, may be represented by an amplitude and a phase of an electric field vector and may be defined as having one of a linear polarization, elliptical polarization, and circular polarization.

In some embodiments, the process 60 may further include a step of utilizing a Deep Neural Network (DNN) to convert the time-series dataset into images and perform a Root Cause Analysis (RCA) for classifying external events. The DNN may be configured to utilize one or more of a Gramian Agular Summation Field (GASF) procedure, a Wavelet Transform (WT) procedure, a sliding window procedure, and a matrix stacking procedure.

For example, the GASF procedure may include a) scaling the time-series dataset to be within a numeric range, b) convert the time-series dataset to a polar coordinate system using an angular cosine technique to create a vector having polar encoding, and c) using GASF to transform the vector into a matrix. The WT procedure, for example, may include a) generating a grayscale image of a power spectrum of each data point of the time-series dataset, b) decomposing a function into a set of wavelets, and c) using WT to convert one-dimensional data points to two-dimensional grayscale images. The sliding window procedure, for example, may include a) generating a matrix for each time-series data point under consideration, and b) applying Fourier transform to the matrix. The matrix stacking procedure, for example, may include a) converting the time-series dataset into a group of matrices, b) stacking the matrices into a larger multi-variate matrix including a resultant image having an RGB format, c) passing the resultant image to a three-channel neural network including one or more of a Convolution Neural Network (CNN), an image-processing DNN, a Recurrent Neural Network (RNN), and a region-based Mask CNN (Mask R-CNN), and d) converting the resultant image to grayscale as a grayscale spectrogram. The matrix stacking procedure, for example, may further include e) passing the stacked multi-variate matrix through CNN using Region of Interest (RoI) pooling to identify anomalous regions and to determine when an anomaly occurs in time for anomaly classification.

The measurements of the polarization characteristics may be obtained from coherent optics equipment of the optical network. The coherent optics equipment, for example, may include an optical receiver of a Network Element (NE) operating in the optical network. The optical receiver may be configured to measure the polarization characteristics during an equalization process of coherent optical communications within the optical network without the need for dedicated sensing devices.

In some embodiments, the process 60 may further include utilize the vibration characteristics to predict damage to an infrastructure in the vicinity of the optical fiber. The process 60 may also include detecting a pattern or anomaly in the time-series dataset using a Bidirectional Generative Adversarial Network (BiGAN) unsupervised learning technique. For example, the BiGAN unsupervised learning technique may utilize a generator, encoder, and discriminator. Also, the BiGAN unsupervised learning technique may further utilize a decomposition element and a clustering element.

NE (in-Skin) Pattern Detection

To detect many vibrations of interest, the NE 10 may use a high SOP sampling frequency. However, this could potentially result in creating too much data to offload from the NE 10. Using the processes described in U.S. Pat. No. 9,871,582, a DNN may be installed on the NE 10 near where SOP data is being estimated and process the data directly on the NE 10. In other words, the processing and pattern detection described with respect to FIGS. 3-5 may be performed on the NE 10 itself.

CONCLUSION

| Feature | Implementation in the present disclosure |
|---|---|
| Types of time-series | 3-dimensional SOP estimates |
| Dimension of time-series | 3-dimensional (3 × k for k DWDM channels) |
| Machine learning focus | Pattern classification/Clustering |
| Solution space | Multichannel CNN |
| Conversion to image | GASF/GADF, Wavelet Spectrogram to grayscale |
| Image processing | Fourier/Wavelet transform |
| System focus | DNN architecture |
| Advantage | Application to multi-variate time-series, specifically SOP estimates<br>Lower complexity due to grayscale usage |

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium configured to store computer logic having instructions that, when executed, cause one or more processing devices to:
   obtain a time-series dataset that includes measurements of polarization characteristics of light traversing an optical fiber of an optical network, wherein the measurements are from a coherent optical receiver connected to the optical fiber, and wherein the measurements are obtained while the coherent optical receiver tracks State of Polarization (SOP) transients for compensation thereof, and
   detect vibration characteristics of the optical fiber based on the time-series dataset.

2. The non-transitory computer-readable medium of claim 1, wherein the time-series dataset is a multi-variate dataset, and wherein the SOP is represented by an amplitude and a phase of an electric field vector and may be defined as having one of a linear polarization, elliptical polarization, and circular polarization.

3. The non-transitory computer-readable medium of claim 1, wherein the instructions further enable the one or more processing devices to utilize a Deep Neural Network (DNN) to convert the time-series dataset into images and perform a Root Cause Analysis (RCA) for classifying external events.

4. The non-transitory computer-readable medium of claim 3, wherein the DNN is configured to utilize one or more of a Gramian Agular Summation Field (GASF) procedure, a Wavelet Transform (WT) procedure, a sliding window procedure, and a matrix stacking procedure.

5. The non-transitory computer-readable medium of claim 4, wherein the GASF procedure includes
   scaling the time-series dataset to be within a numeric range,
   convert the time-series dataset to a polar coordinate system using an angular cosine technique to create a vector having polar encoding, and
   using GASF to transform the vector into a matrix.

6. The non-transitory computer-readable medium of claim 4, wherein the WT procedure includes
   generating a grayscale image of a power spectrum of each data point of the time-series dataset,
   decomposing a function into a set of wavelets, and
   using WT to convert one-dimensional data points to two-dimensional grayscale images.

7. The non-transitory computer-readable medium of claim 4, wherein the sliding window procedure includes
   generating a matrix for each time-series data point under consideration, and
   applying Fourier transform to the matrix.

8. The non-transitory computer-readable medium of claim 4, wherein the matrix stacking procedure includes
   converting the time-series dataset into a group of matrices,
   stacking the matrices into a larger multi-variate matrix including a resultant image having an RGB format,
   passing the resultant image to a three-channel neural network including one or more of a Convolution Neural Network (CNN), an image-processing DNN, a Recurrent Neural Network (RNN), and a region-based Mask CNN (Mask R-CNN), and
   converting the resultant image to grayscale as a grayscale spectrogram.

9. The non-transitory computer-readable medium of claim 8, wherein the matrix stacking procedure further includes passing the stacked multi-variate matrix through CNN using Region of Interest (RoI) pooling to identify anomalous regions and to determine when an anomaly occurs in time for anomaly classification.

10. The non-transitory computer-readable medium of claim 1, wherein the coherent optical receiver is configured to measure the polarization characteristics during an equalization process of coherent optical communications within the optical network without the need for dedicated sensing devices.

11. The non-transitory computer-readable medium of claim 1, wherein the instructions further enable the one or more processing devices to utilize the vibration characteristics to predict damage to an infrastructure in the vicinity of the optical fiber.

12. The non-transitory computer-readable medium of claim 1, wherein the instructions further enable the one or more processing devices to detect a pattern or anomaly in the time-series dataset using a Bidirectional Generative Adversarial Network (BiGAN) unsupervised learning technique.

13. The non-transitory computer-readable medium of claim 12, wherein the BiGAN unsupervised learning technique includes the utilization of a generator, encoder, and discriminator.

14. The non-transitory computer-readable medium of claim 13, wherein the BiGAN unsupervised learning technique further includes the utilization of a decomposition element and a clustering element.

15. A system comprising:
a processing device, and
a memory device configured to store a computer program having instructions that, when executed, enable the processing device to
obtain a time-series dataset that includes measurements of polarization characteristics of light traversing an optical fiber of an optical network, wherein the measurements are from a coherent optical receiver connected to the optical fiber, and wherein the measurements are obtained while the coherent optical receiver tracks State of Polarization (SOP) transients for compensation thereof, and
detect vibration characteristics of the optical fiber based on the time-series dataset.

16. The system of claim 15, wherein the time-series dataset is a multi-variate dataset, and wherein the SOP is represented by an amplitude and a phase of an electric field vector and may be defined as having one of a linear polarization, elliptical polarization, and circular polarization.

17. The system of claim 15, wherein the instructions further enable the processing device to utilize a Deep Neural Network (DNN) to convert the time-series dataset into images and perform a Root Cause Analysis (RCA) for classifying external events, and wherein the DNN is configured to utilize one or more of a Gramian Agular Summation Field (GASF) procedure, a Wavelet Transform (WT) procedure, a sliding window procedure, and a matrix stacking procedure.

18. A method comprising the steps of:
obtaining a time-series dataset that includes measurements of polarization characteristics of light traversing an optical fiber of an optical network, wherein the measurements are from a coherent optical receiver connected to the optical fiber, and wherein the measurements are obtained while the coherent optical receiver tracks State of Polarization (SOP) transients for compensation thereof, and
detecting vibration characteristics of the optical fiber based on the time-series dataset.

19. The method of claim 18, wherein the time-series dataset is a multi-variate dataset, and wherein the SOP is represented by an amplitude and a phase of an electric field vector and may be defined as having one of a linear polarization, elliptical polarization, and circular polarization.

* * * * *